United States Patent [19]
Costanzo

[11] Patent Number: 5,511,338
[45] Date of Patent: Apr. 30, 1996

[54] SPOON FISHING LURE ASSEMBLY

[76] Inventor: Joseph Costanzo, 1931 Southern Blvd. NW. Apt. 5, Warren, Ohio 44482

[21] Appl. No.: 319,228

[22] Filed: Oct. 6, 1994

[51] Int. Cl.$^6$ .......................... A01K 85/01; A01K 85/14
[52] U.S. Cl. ................. 43/42.28; 43/42.31; 43/42.34; 43/42.5
[58] Field of Search ................. 43/42.09, 42.5, 43/42.31, 42.32, 42.33, 42.34, 42.25, 42.26, 42.28, 42.15, 42.18; D22/126, 128, 129

[56] References Cited

U.S. PATENT DOCUMENTS

| | | | |
|---|---|---|---|
| 2,000,734 | 5/1935 | Accetta | 43/42.18 |
| 2,199,001 | 4/1940 | Khoenle | 43/42.28 |
| 2,546,437 | 3/1951 | Gambill | 43/42.28 |
| 3,091,049 | 5/1963 | Reimers | 43/42.31 |
| 3,855,722 | 12/1974 | Moore | 43/42.34 |
| 4,228,611 | 10/1980 | McGehee | 43/42.53 |
| 4,484,405 | 11/1984 | Woods | 43/4.5 |
| 4,689,914 | 9/1987 | Quinlan | 43/42.22 |
| 4,696,121 | 9/1987 | Hernden | 43/17.2 |
| 4,745,699 | 5/1988 | Gage | 43/42.09 |
| 4,785,569 | 11/1988 | Thomas, Jr. | 43/42.31 |
| 4,791,749 | 12/1988 | Stazo | 43/42.29 |
| 4,831,764 | 5/1989 | Jecevicus | 43/42.25 |
| 4,843,754 | 7/1989 | Spelts | 43/44.81 X |

OTHER PUBLICATIONS

Cabela's Tackle Shop 1994 Catalog pp. 89, 104, 107, 128.
Netcraft Fishing 1994 Tackle Catalog 94A; pp. 21, 25, 42, 48.

Primary Examiner—P. Austin Bradley
Assistant Examiner—Jeanne M. Elpel
Attorney, Agent, or Firm—Robert R. Hussey Co.

[57] ABSTRACT

A fishing lure is provided for use by fishermen and includes a body member having a front end with a front aperture therethrough and a rear end with a rear aperture therethrough. The fishing lure includes a simulated eye assembly and means for securing and sealing the simulated eye assembly to the body member. The simulated eye assembly has a base, a transparent cover having a dome portion received in the front aperture and a rim portion extending outwardly of the dome portion. The rim portion is secured to the base, with the base and the transparent cover defining a chamber. The simulated eye assembly also includes a ball freely disposed in the chamber. The fishing lure also includes a fishing hook having a shank portion and a skirt member having a head portion with an aperture therethrough. Means are provided for removably securing the shank portion of the fishing hook to the body member through the rear aperture. The fishing lure also includes a crimped member having a front portion secured to the rear end of the body member, a back portion removably secured to the fishing hook, a plurality of tubular portions extending towards the back portion of the crimped member, and a plurality of skirt members. Each skirt member has an inserting portion positioned in one of the tubular portions and a skirt portion having a plurality of strands extending from the tubular portion and the back portion to surround a portion of the fishing hook.

13 Claims, 3 Drawing Sheets

SPOON FISHING LURE ASSEMBLY

BACKGROUND OF THE INVENTION

The present invention relates generally to fishing lures and in particular fishing lures having a spoon type body provided with a simulated eye assembly and a removably secured fishing hook with a changeable skirt member to aid a fisherman in altering the lure's appearance.

Success in the sport of fishing, like no other sport, almost exclusively depends on the type of equipment used, rather than the skill of the participator. Fishing lures are an invaluable tool to the recreational and professional fisherman's mastery of the sport. To assist the fisherman, there are numerous types of fishing lures specially designed to attract certain fish. The majority of fishing lures can be placed into one of the general categories including jigs, plugs, spoons and top water fishing lures.

Jig fishing lures typically consist of a fishing hook having an eyelet and a shank portion having a weighted leadhead leaving the eyelet uncovered and attachable to a fishing line. Plug lures generally have a full-bodied wooden or plastic member simulating a live fish with fishing hooks attached to various portions of the full-bodied member. Top water lures are made of various types of material and body shapes which allow the lure to float on the surface of the water with fishing hooks attached to different portions of the body. On the other hand, spoon lures customarily have a thin spoon shaped body member with a fishing hook attached to the rear of the thin body member. Numerous modifications have been made to the above described fishing lures in order to alter their appearance and attract fish.

One modification found in some fishing lures utilizes a movable eye. For example, U.S. Pat. No. 3,855,722 to Moore, discloses one known jig type lure with a head portion provided with recessed cavities into which artificial eyes are inserted by force or wedging into the cavities and retained by reason of the undercut configuration of the walls of the cavities, or by a cement or adhesive. This patent requires several complex manufacturing steps to install the artificial eyes, making manufacturing of these lures awkward and expensive.

Another type of fishing lure is illustrated in U.S. Pat. No. 4,831,764 to Jecevicus. This patent discloses a top water fishing lure which shows an artificial eye means attached to the bottom of a wooden block body.

Other fishing lures include skirt dressings attached to a portion of the lure to simulate tails, fins, wings or legs, while partially concealing the fishing hook. Also a top water fishing lure is shown in U.S. Pat. No. 4,689,914 to Quinlan with a hollowed head member having a removable skirt dressing and an imbedded fastener clip which can detachably secure a tail assembly. U.S. Pat. No. 4,484,405 to Woods and 4,228,611 to McGahee show respectively a swivel jointed clasp and a hanger arrangement for removably connecting a hook to a fishing lure.

There are a number of fishing lures having the objective of presenting a life-like appearance. However, spoon lures which are particularly used in pike, walleye, bass and trout fishing have generally relied on the particular color scheme of the spoon lure to attract fish, rather than relying on a life-like appearance.

Accordingly, it is desirable to provide a spoon type lure presenting a life-like appearance. Likewise, it is desirable to provide a spoon lure construction having a simulated eye assembly. Also, rather than simply adhering the eye assembly to a lure, it is desirable to provide a simulated eye assembly that has structural rigidity, while allowing for convenient mounting.

It is recognized that fish are also attracted to the movement of a bait or lure. Another factor which many lure manufacturers consider in achieving the objective of life-like appearance is the movement of the lure through water. The closer a lure can imitate the swimming motion of a minnow or similar type of live bait, the more likely a fish will be attracted to that lure. Accordingly, it is desirable to provide a spoon type lure that imitates the movement of various live bait. Likewise, it is desirable to provide a spoon type lure shaped such that the lure produces a wobbling motion through water.

The particular appearance of a spoon lure on a given day is important for catching pike, walleye, bass and trout. Fishermen often try a number of lures varying in appearance in an attempt to determine which lure performs the best on a given day. Accordingly, it is desirable to provide a spoon type lure presenting a life-like appearance and allowing for a change of appearance. Likewise, it is desirable to provide a removable skirt member adjacent the fishing hook which can be changed to alter the color of the skirt member and consequently the general appearance of the spoon lure, while concealing the fishing hook. Also, it is desirable to provide a spoon lure construction having a removably secured fishing hook to allow for varying hook sizes and the changing of skirt members.

SUMMARY OF THE PRESENT INVENTION

The present invention provides the above described desirable features with an improved fishing lure. The fishing lure of the present invention is provided for use by fishermen and includes a body member having a front end with a front aperture therethrough and a rear end with a rear aperture therethrough.

The fishing lure includes a simulated eye assembly and means for securing and sealing the simulated eye assembly to the body member. The simulated eye assembly has a base, a transparent cover having a dome portion received in the front aperture and a rim portion extending outwardly of the dome portion. The rim portion is secured to the base, with the base and the transparent cover defining a chamber. The simulated eye assembly also includes a ball freely disposed in the chamber.

The fishing lure of the present invention also includes a fishing hook having a shank portion, and a skirt member having a head portion with an aperture therethrough. The aperture of the head portion of the skirt slidably receives the shank of the fishing hook. Means are provided for removably securing the shank of the fishing hook to the body member through the rear aperture.

The fishing lure of the present invention also includes a skirt retainer having a front portion secured to the rear end of the body member, a back portion removably secured to the fishing hook, a plurality of tubular portions extending towards the back portion of the skirt retainer, and a plurality of skirt members. Each skirt member has an inserting portion positioned in one of the tubular portions and a skirt portion having a plurality of strands extending from the skirt retainer to surround a portion of the fishing hook. Means may also be provided for removably securing the skirt retainer to the body member.

The fishing lure of the present invention provides the desirable features described above. The present invention provides a fishing lure that includes a simulated eye assembly positioned in the front aperture of the body member. The dome portion of the simulated eye assembly is positioned in the front aperture toward one of the sides of the body member, with either or both the base or the rim portion having an outer circumference greater than the circumference of the front aperture, allowing for simple positioning and securement of the simulated eye assembly in the front aperture.

The fishing lure of the present invention provides the desired feature of structural rigidity by the mounting of a simulated eye assembly. The structural rigidity is provided by the front aperture of the body member and the simulated eye assembly positioned in the front aperture with a transparent coating material covering the positioned simulated eye assembly and adjacent portion of the body member. The transparent coating material provides the structural rigidity by sealing and securing the simulated eye assembly in the front aperture while not interfering with the life-like appearance of the eye.

The present invention provides a fishing lure that permits a fisherman to alter the appearance of the fishing lure without removing the fishing lure from the line. The means for removably securing the fishing hook to the body member allow the fishing hook to be quickly changed from the fishing lure. When the fishing hook is removed, the skirt member may be slidably removed from the fishing hook and replaced by a skirt member of a different color or the fishing hook may be replaced by a fishing hook of a different size.

Other desirable features and advantages of the present invention will become apparent from a study of the following description and the accompanying drawings which are illustrative of the invention.

DETAILED DESCRIPTION OF THE INVENTION

Figure 1:
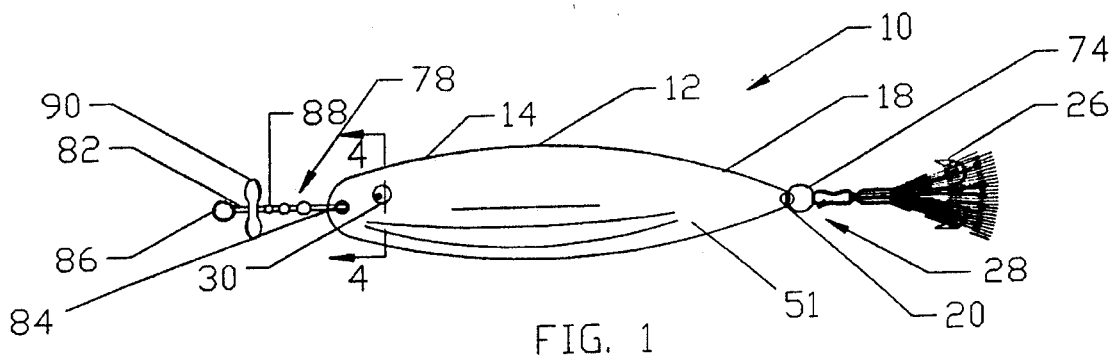
FIG. 1 is a top view of the fishing lure of the present invention.
Figure 1A:
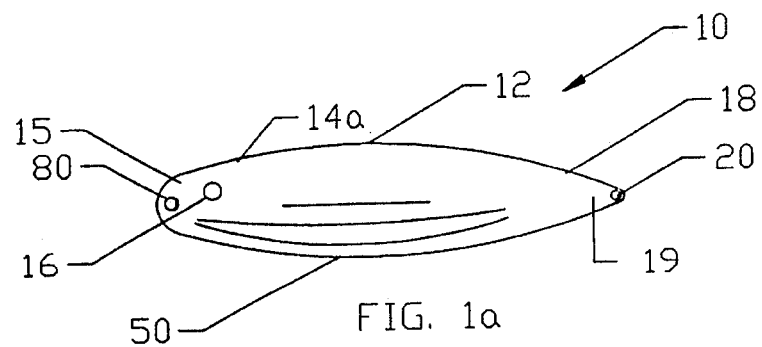
FIG. 1a is a partial top view of the FIG. 1 embodiment showing the body member of the fishing lure.
Figure 2:
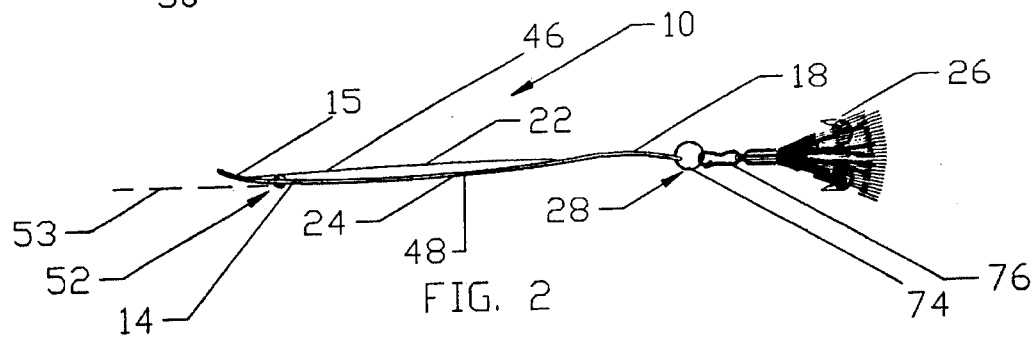
FIG. 2 is a side view of the fishing lure showing in FIG. 1.

A fishing lure 10 is provided as shown in FIGS. 1 and 2. The fishing lure 10 of the present invention includes a thin rigid material forming a body member 12 as shown in FIGS. 1, 1a and 2. The body member 12 has a front end 14 having a front aperture 16, a rear end 18, a face side 22, and a rear side 24 substantially parallel to the face side 22,. The fishing lure 10 also includes a fishing hook 26 and means, generally indicated at 28, for connecting the fishing hook to the body member 12.

Figure 4:
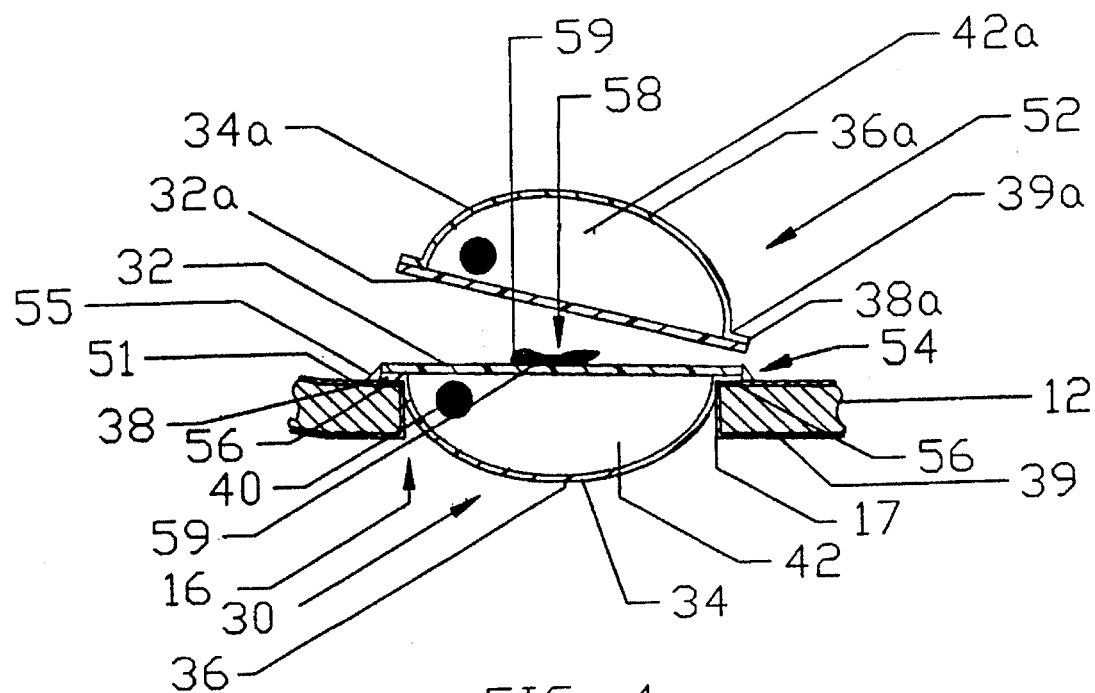
FIG. 4 is an enlarged fragmentary sectional view of the fishing lure shown in FIG. 1 taken along lines 4—4 thereof showing the simulated eye assembly positioned before application of the sealing and securing means.
Figure 5:
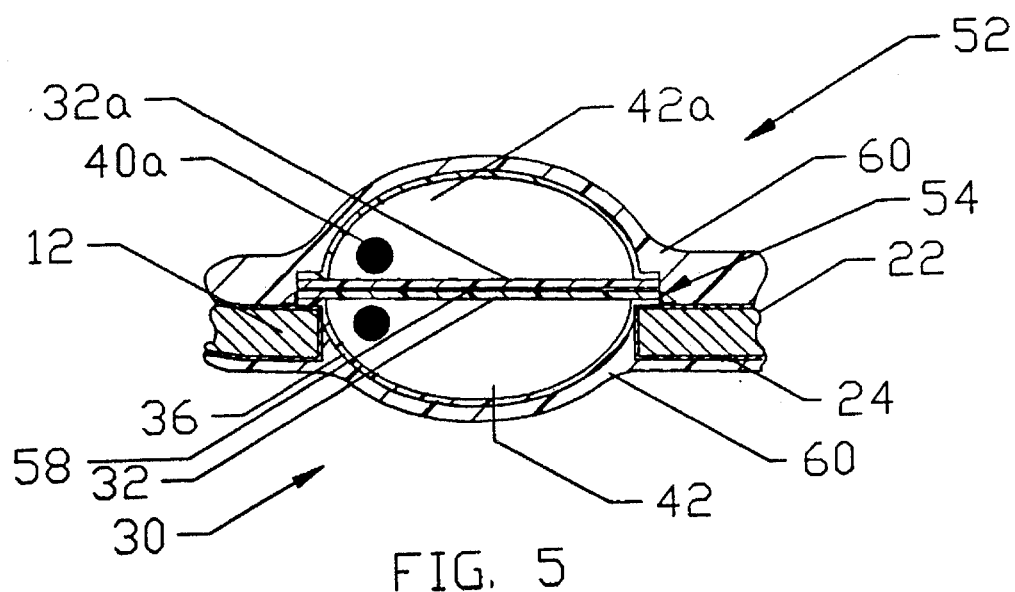
FIG. 5 is an enlarged fragmentary sectional view of the fishing lure shown in FIG. 4 showing the means for sealing and securing the simulated eye assembly.

As seen in FIGS. 1, 4 and 5 the fishing lure 10 also includes a simulated eye assembly, generally indicated at 30. The simulated eye assembly 30 includes a base 32, a transparent cover 34 having a dome portion 36 and a rim portion 38 extending radially outward and substantially perpendicular to the edge 39 of the dome portion, and a ball 40. The rim portion 38 is secured to the base 32 by any conventional means such as an adhesive and preferably a non-water soluble adhesive.

The base 32 and the transparent cover 34 define a chamber 42. The ball 40, preferably of a rounded shape, is freely disposed in the chamber 42. The dome portion 36 is positioned in the front aperture 16 toward one of the sides 22, 24. Either or both the base 32 and the rim portion 38 has a geometric configuration such that at least a portion of the geometric configuration has a width greater than the circumference of the front aperture 16. The width of the geometric configuration of the base 32 or rim portion 38 provides for frictional engagement with the portion 56 of the body member 12 adjacent the front aperture 16. Either or both the base 32 and the rim portion 38 are secured to the other side 22, 24 of the body member 12. Means 60 are provided for securing and sealing the simulated eye assembly 30 to the body member 12.

In the preferred embodiment of the present invention, the eye simulation is formed by a simulated eye assembly 30. It should be understood that it is within the contemplation of this invention that the simulated eye assembly 30 may be formed from any other eye simulation means that provide a simulated eye. For example, a prism tape lure eye or a decal plug eye may be adhered to the front end 14 of the body member 12 to simulate an eye.

In the preferred embodiment of the present invention, the thin rigid material forming the body member 12 is preferably made from pressed or rolled nickel or brass. It should be understood that it is within the contemplation of this invention that the body member 12 may be formed from any other non-corrodible material that provides a spoon shaped body member. The body member 12 has a face side 22 with a generally convex surface 46 and a Tear side 24 with a generally concave surface 48. Additionally, the body member 12 has a center portion 50 that is wider than the front and rear ends 16, 18. The convex and concave surfaces 46, 48, respectively and the center portion 50 form the spoon shape of the body member 12 with the face side 22 substantially parallel to the rear side 24, as seen in FIGS. 1 and 2.

The front end 14 of the body member 12 has a front end portion 15 which is angled from the longitudinal axis 53 of the body member. The rear end 18 of the body member 12 has a rear end portion 19 which is angled in a direction opposite the angled front end portion 15. The body member 12 is preferably so shaped as to cause the fishing lure 10 to wobble through the water creating an attracting life-like movement.

A suitable finish 51, such as paint, is applied to the body member 12. The finish 51 is applied to both sides 22, 24 of the body member 12 and through the apertures 16, 20 and 80 of the body member 12 as will be herein further described. The finish. 51 preferably provides a variable two toned colored surface with an enticing appearance.

The simulated eye assembly 30 of the lure 10 is secured by means, generally indicated at 54, in the front aperture 16 of the body member 12, as seen in FIGS. 4 and 5. The means 54 includes the frictional engagement of the dome portion 36 in the front aperture 16. The means 54 further includes the paint finish 51 covering the periphery 17 of the aperture 16. The paint finish 51 provides uniformity to the periphery 17 and accommodates the geometric configuration of the dome portion 36 positioned in the aperture 16. The flexibility of the paint 51 allows for frictional engagement between the dome 36 and the aperture 16. The means 54 may further include any conventional means such as an adhesive 55 securing the base 32 and rim portion 38 to the portion 56 of the body member 12. The adhesive 55 is preferably a non-water soluble adhesive.

A second simulated eye assembly 52 of the lure 10 is shown in FIGS. 2, 4 and 5 and is similar in construction with the simulated eye assembly 30 described above. For ease of description, the second simulated eye assembly 52 is numbered with numerals the same as used in connection with the simulated eye assembly 30 to denote common parts where appropriate and followed by the suffix letter "a" to denote the particular second simulated eye assembly.

The fishing lure 10 has a second simulated eye assembly 52 positioned opposite the other simulated eye assembly 30. The second simulated eye assembly 52 includes a base 32a, a transparent cover 34a having a dome portion 36a and a rim portion 38a extending radially outward and substantially perpendicular to the edge 39a of the dome portion, and a ball 40a. The rim portion 38a is secured to the base 32a by any conventional means such as an adhesive and preferably a non-water soluble adhesive, with the base and the transparent cover 34a defining a chamber 42a. The ball 40a is freely disposed in the chamber 42a. The base 32a of the second simulated eye assembly 52 is secured to the base 32 of the simulated eye assembly 30 by any conventional means such as an adhesive and preferably a non-water soluble adhesive. When the second simulated eye assembly 52 is secured to the other simulated eye assembly 30, the front end 14 of the body member 12 has the appearance of a head with eyes.

As seen in FIG. 4, the base 32a of the second simulated eye assembly 52 is secured by means 58 to the base 32 of the other simulated eye assembly 30. The means 58 includes any conventional means such as for example, an adhesive 59 applied between the base 32a and the base 32 of the simulated eye assembly 30. The adhesive 59 preferably includes a non-water soluble adhesive. It should be understood that it is within the contemplation of this invention that the means 58 may include any other adhesive material including two-sided adhesive tape.

As seen in. FIG. 5, the pair of simulated eye assemblies 30, 52 are sealed and secured to the portion 56 of the body member 12 adjacent the front aperture 16 by means 60. It is within the contemplation of this invention that the means 60 may be used to seal and secure one of the eye assemblies 30, 52 to the body 12. For example, if only the simulated eye assembly 30 is provided, the means 60 would cover the simulated eye assembly 30 and portion 56 of the body 12.

In the preferred embodiment of the present invention, the eye simulation is formed by a simulated eye assembly 30. It should be understood that it is within the contemplation of this invention that the simulated eye assembly 30 may be formed from any other eye simulation means that provide a simulated eye. For example, a prism tape lure eye or a decal plug eye may be adhered to the front end 14 of the body member 12 to simulate an eye. It is within the contemplation of this invention that the means 60 may be used to seal and secure any other eye simulation means adhered to the body member 12.

The securing and sealing means 60 is preferably a transparent coating material allowing for the dipping of the simulated eye assemblies 30, 52. Preferably, the coating material 60 solidifies after dipping providing a transparent coating around the simulated eye assemblies 30, 52 and the portion 56 of the body member 12 adjacent the eye. The solidifiable transparent coating seals and secures the simulated eye assemblies 30, 52 to the body 12 and further provides structural rigidity to the assemblies without interfering with the life-like appearance of the eyes. One product that provides the transparent coating material is the product of solidifiable transparent vinyl liquid. It should be understood that other means 60 for sealing and securing the simulated eye assemblies 30, 52 is fully within the contemplation of this invention. It should also be understood that the means 60 secures bases 32 and 32a of the pair of simulated eye assemblies 30, 52 respectively, performing the function of the adhesive 59 applied between the two bases.

Figure 3:
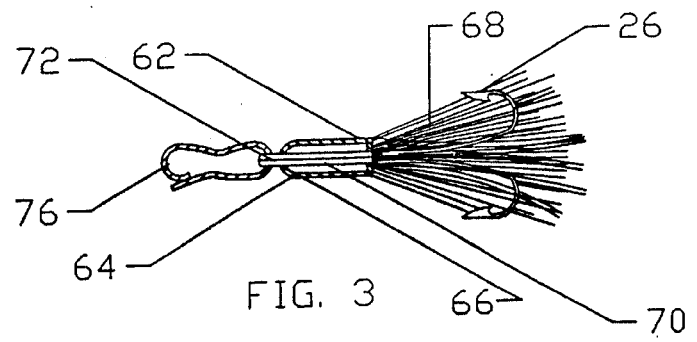
FIG. 3 is an enlarged partial sectional view of the FIG. 1 embodiment showing the quick disconnect clip, skirt member and fishing hook.

As seen in FIG. 3, the fishing lure 10 of the present invention also includes a skirt member 62 which is provided to conceal the hook 26 and may be substituted with a number of colors and sizes. The skirt member 62 has a head portion 64 with an aperture 66 therethrough and a skirt portion 68 extending rearwardly from the head portion. Preferably, the skirt member 62 is made from a colored flexible material such as plastic. It should be understood that it is within the contemplation of this invention that the size and length of the skirt member 62 may vary based on the size and length of the fishing hook 26. It should also be understood that it is within the contemplation of this invention that the skirt member 62 may be formed from any colored material that provides a flexible skirt member and skirt portion.

The fishing hook 26 of the fishing lure 10 includes a shank portion 70 having an eye 72. The shank portion 70 is slidably received through the aperture 66 of the skirt member 62 with the eye 72 of the fishing hook 26 extending through the head portion 64 of the skirt member. The skirt portion 68 or the skirt member 62 substantially conceals the fishing hook 26 creating a life-like appearance while attracting fish with its color and movement. The skirt member 62 is slidably removable from the fishing hook 26 in order to facilitate the changing of skirt members and thus the appearance of the fishing lure.

The fishing hook 26 is removably secured by means, generally indicated at 28, to the rear end 18 of the body member 12 as seen in FIGS. 1 and 2. The means 28 includes a quick disconnect clip 76 removably secured to the rear aperture 20 of the rear end portion 19 and a split ring 74. The eye 72 of the fishing hook 26 is removably secured to the quick disconnect clip 76.

The quick disconnect clip 76 allows the fishing hook 26 or skirt member 62 to be easily changed. When fishing conditions warrant a change of fishing lure appearance, the hook 26 or skirt member 62 may be changed by removing the hook 26 from the quick disconnect clip 76. After removal of the hook 26, the skirt member 62 may be slidably removed from the shank 70 of the hook 26 and replaced by a different colored or shaped skirt member. The hook 26 with the different skirt member 62 may then be easily reconnected to the body member 12 by threading the quick disconnect clip 76 through the eye 72 of the hook.

For further convenience, it should also be appreciated that the clip 76 with hook 26 and skirt 62 attached, may be removed from the split ring 74 and replaced by a substitute hook and skirt member combination previously connected to another quick disconnect clip.

The body member 12 of the lure 10 is secured by means, generally indicated at 78, to a fishing line (not shown). The means 78 are provided to secure the lure 10 to a fishing line through a first aperture 80 of the front end portion 15 as seen in FIG. 1. The means 78 includes a conventional wire shaft 82 having a shaped end 84 secured through the first aperture 80 and second shaped end 86 to receive a fishing line. Preferably, the wire Shaft 82 includes beads 88 and a propeller blade 90 provided to attract fish. It should be understood that other means 78 for securing the body member 12 to the fishing line is fully within the contemplation of this invention.

Figure 6:
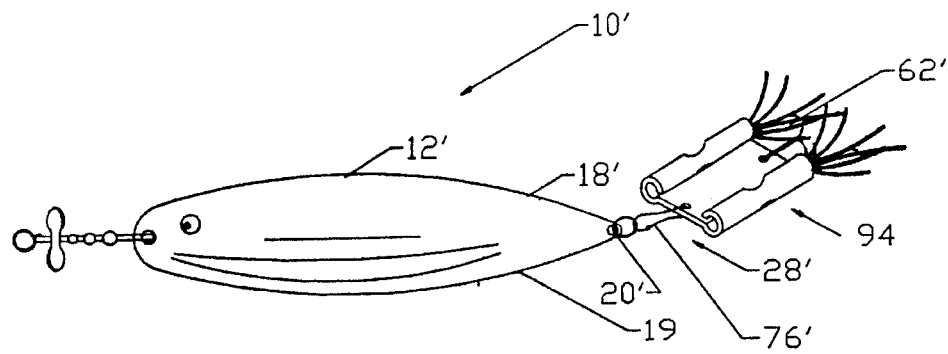
FIG. 6 is a top perspective view of another embodiment of the fishing lure of the present invention.
Figure 7:
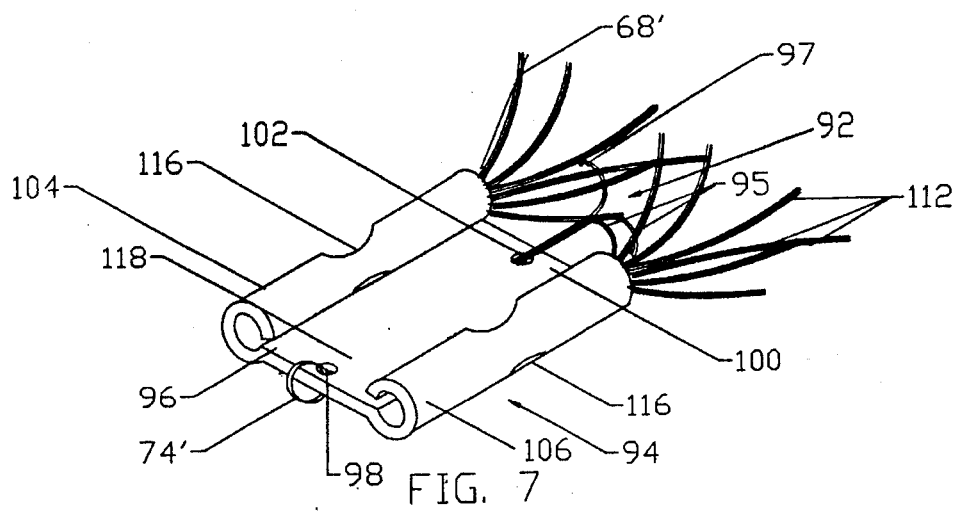
FIG. 7 is an expanded partial perspective view of the FIG. 6 embodiment showing the means for removably securing the fishing hook.
Figure 8:
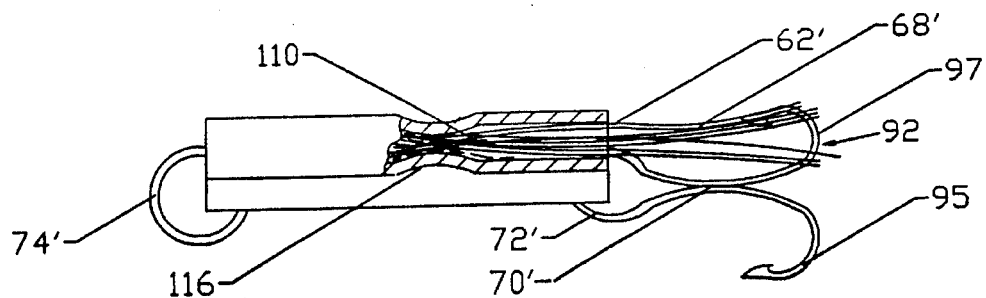
FIG. 8 is a side view of the FIG. 7 embodiment showing the means for removably securing the fishing hook.

Another embodiment of the fishing lure 10' of the present invention is shown in FIGS. 6, 7 and 8 and is similar in construction with the fishing lure 10 described above. For ease of description, the fishing lure 10' is numbered with numerals the same as used in connection with the fishing lure 10 to denote common parts where appropriate and followed by a prime mark "'" to denote the fishing lure 10'.

As seen in FIG. 6, the fishing lure 10' provides an alternate construction of the fishing hook 92, and means 28' for securing the fishing hook 92 to the rear end 18' of the body member 12'.

The fishing hook 92 of the fishing lure 10' is secured by means, generally indicated at 28', to the rear end 18' of the body member 12' through the rear aperture 20'. As seen in FIGS. 7 and 8, the fishing hook 92 includes a split treble type hook 92 having an eye 72' allowing the fishing hook 92 to be removably secured to the means 28'.

Means 28' securing the fishing hook 92 to the body member 12' includes a skirt retainer 94 having a front portion 96 secured to the rear end 18' of the body member 12'. The front portion 96 has an aperture 98 therethrough for receiving a split ring 74'. The split ring 74' is connected to a quick disconnect clip 76' and the clip 76' is secured to the rear end 18' of the body 12' through the rear aperture 20'. The clip 76' allows for changing the skirt retainer 94 and consequently the hook 92 attached thereto as will be hereinafter more fully described.

The skirt retainer 94 has a back portion 100 having an aperture 102 therethrough. While the fishing hook 92 may be of any construction known to those skilled in the art, preferably the hook 92 is a split designed treble type hook 92 having a pair of hooks on one leg 95 and another hook on the other leg 97 with the legs 95, 97 extending to form a split shank 70'. The hook 92 may then be secured to the skirt retainer 94 through the aperture 102 by extending the hook of the other leg 97 through the aperture and then pulling the hook through the aperture as seen in FIGS. 7 and 8, so that the shank 70' of the hook is secured to the skirt retainer 94.

The skirt retainer 94 provides for securing the skirt members 62' so that the skirt portions 68' of the skirt member 62' substantially surround the hook 92 and provide for further attracting fish to the lure. To secure the skirt members 62' to the skirt retainer 94, the tubular portions 104, 106 are provided and extend towards the back portion 100 of the skirt retainer and generally towards the hook 92. The skirt retainer 94 is constructed from a flat malleable material which has curled opposite ends comprising the tubular portions 104, 106 and a substantially flat center portion 118. Preferably, the malleable material is non-corrodible. It should be understood that it is within the contemplation of this invention that the skirt retainer 94 may include additional tubular portions.

Each of the skirt members 62' has an inserting portion 110 which is positionable in one of the tubular portions 104, 106 and a skirt portion 68' having a plurality of strands 112 extending from the tubular portion and surrounding at least a portion of the hook 92. The skirt portions 68' substantially conceal the fishing hook 92 creating a life-like appearance while attracting fish with their color. The skirt members 62' are made from a colored flexible material such as feathers, hairs or plastic.

Means 116 are provided for securing the skirt members 62' in each of the tubular portions 104,106. The inserting portions 110 of the skirt members 62' are positioned in the tubular portions 104, 106 and the tubular portions are crimped with a conventional crimping tool (not shown). Crimping the tubular portions 104, 106 provides for securing the inserting portions 110 within the respective tubular portion while allowing the skirt portions 68' to substantially conceal the fishing hook 92 and provide an attracting life-like appearance. It should be understood that other means 116 for securing the inserting portions 110 within the tubular portions is fully within the contemplation of this invention. For example, the means 116 may include an adhesive securing the inserting portions 110 within the respective tubular portions.

The construction described allows for changing the skirt retainer 94 and consequently changing the color and size of the skirt members 62' to adapt to particular fishing conditions and different sized fishing hooks 92. For example on some days and in some locations the fish will be attracted to a particular color and on other days and in other locations the fish will be attracted to other colors. To facilitate the alteration of the lure 10' appearance, the skirt retainer 94 can be quickly replaced by a skirt retainer having different skirt members. The skirt retainer can be changed by readily disconnecting the split ring 74' of the skirt retainer 94 from the quick disconnect clip 76' and substituting a different skirt retainer. The different skirt retainer is connected to the body member 12' by connecting the split ring of the different skirt retainer to the quick disconnect clip 76'.

The lure 10' can also be used for different sizes of fish and accordingly the size of the fishing hook can be changed. Likewise, the skirt retainer 94 can also be changed to accommodate the size of the fishing hook. The split designed treble hook 92 can be easily removed from the skirt retainer 94 by pulling the hook of the split shank 70' through the aperture 102 of the back portion 100 of the skirt retainer 94. It should be understood that the fishing hook 92 may also be secured to a split ring positioned through the aperture 102 of the back portion 100.

The invention has been described with reference to the preferred embodiments. Obviously, modifications and alterations will occur to others upon reading and understanding of this specification. It is my intention to include all modifications and alterations insofar as they come within the scope of the appended claims or equivalents thereof.

What is claimed is:

1. A spoon fishing lure assembly comprising:

(a) a body member formed from a thin rigid material and having a front end and a rear end, said front end having a front aperture therethrough, said body member having a face side and a rear side substantially parallel said face side:

(b) a fishing hook, (c) means for connecting said fishing hook to said body member, (d) a first simulated eye assembly comprising a base, a transparent cover having a dome portion received in said front aperture and a rim portion extending outwardly of said dome portion, said rim portion secured to said base, said base and said cover defining a chamber, said first simulated eye assembly including a ball freely disposed in said chamber: said dome portion of said simulated eye assembly positioned in said front aperture toward one of said sides of said body member, one of said base and said rim portion having an outer circumference greater than the circumference of said front aperture, one of said base and said rim portion secured to the other of said sides of said body member, and (e) means for securing and sealing said first simulated eye assembly to said body member.

2. A fishing lure as described in claim 1, which includes a second simulated eye assembly having a base member secured to the base member of said first simulated eye assembly.

3. A fishing lure as described in claim 1, wherein said means for securing said simulated eye assembly to said body member includes frictional engagement of said simulated eye assembly in said front aperture.

4. A fishing lure as described in claim 1, where in said means for securing and sealing said simulated eye assembly to said body member includes a transparent coating material sealing said simulated eye assembly around a portion of said body member adjacent said simulated eye assembly.

5. A fishing lure as described in claim 4, wherein the transparent coating material covers the entire said simulated eye assembly.

6. A fishing lure as described in claim 1, said face side of said body member includes a generally convex arch, said rear side of said body member includes a generally concave arch.

7. A fishing lure as described in claim 1, wherein said body member includes a paint finish conforming to the geometric configuration of the portion of said simulated eye assembly positioned in said front aperture.

8. A fishing lure as described in claim 1, wherein said rear end of said body member has a rear aperture therethrough, said fishing lure including:

(a) a quick disconnect clip, (b) said fishing hook having a shank portion, said shank portion removably secured to said quick disconnect clip, and (c) a skirt member having a head portion with an aperture therethrough and a skirt portion extending rearwardly from said head portion, said aperture of said head portion slidably receiving said shank portion of said fishing hook.

9. A fishing lure comprising:

(a) a body member having a front end and a rear end, said front end having at least one aperture located therethrough, said rear end having a rear aperture located therethrough, (b) a fishing hook, (c) means for removably securing said fishing hook to said body member including a skirt retainer having a front portion secured to said rear end of said body member, a back portion removably secured to said fishing hook, and a plurality of tubular portions extending towards said back portion of said skirt retainer, (d) a plurality of skirt members, each of said skirt members having an inserting portion positioned in one of said tubular portions and a skirt portion having a plurality of strands extending from said tubular portion and said back portion of said skirt retainer and surrounding at least a portion of said fishing hook, and (e) means for securing at least one of said skirt members in each of said tubular portions.

10. A fishing lure as described in claim 9, which includes:

(a) a quick disconnect clip, said quick disconnect clip secured to said body member through said rear aperture.

(b) said fishing hook having a shank portion, said shank portion removably secured to said skirt retainer, and (c) a simulated eye assembly comprising a base, a transparent cover having a dome portion received in said front aperture and a rim portion extending outwardly of said dome portion, said rim portion secured to said base, said base and said cover defining a chamber, said simulated eye assembly including a ball freely disposed in said chamber: said dome portion of said simulated eye assembly positioned in said front aperture toward one of said sides of said body member, one of said base and said rim portion having an outer circumference greater than the circumference of said front aperture, one of said base and said rim portion secured to the other of said sides of said body member.

11. A fishing lure as described in claim 9, said means for securing said skirt member within said tubular portion includes crimping said tubular portions to secure said inserting portion of said skirt member within said tubular portion.

12. A fishing lure comprising; a body member having a front aperture therethrough, a simulated eye assembly including a base, a transparent cover having a dome portion received in said front aperture and a rim portion extending outwardly of said dome portion, said rim portion secured to said base, said base and said cover defining a chamber, said simulated eye assembly including a ball freely disposed in said chamber: said dome portion of said simulated eye assembly positioned in said front aperture toward a side of said body member, one of said base and said rim portion having an outer circumference greater than the circumference of said front aperture, one of said base and said rim portion secured to on opposite side of said body member.

13. A fishing lure as described in claim 12 having means for securing and sealing said simulated eye assembly to said body member and including a transparent coating material sealing said simulated eye assembly around a portion of said body member adjacent said simulated eye assembly.

* * * * *